(12) United States Patent
Ueda et al.

(10) Patent No.: US 7,178,963 B2
(45) Date of Patent: Feb. 20, 2007

(54) BACKLIGHT UNIT UNIFORMLY ILLUMINATING OBJECT REGARDLESS OF LAPSE OF TIME AND LIQUID CRYSTAL DISPLAY PANEL DEVICE USING THE SAME

(75) Inventors: Shoichi Ueda, Tokyo (JP); Yoshinobu Sakaki, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 488 days.

(21) Appl. No.: 10/205,367

(22) Filed: Jul. 26, 2002

(65) Prior Publication Data
US 2003/0026085 A1 Feb. 6, 2003

(30) Foreign Application Priority Data
Jul. 31, 2001 (JP) .............................. 2001-231907

(51) Int. Cl.
*F21V 7/04* (2006.01)
(52) U.S. Cl. .................. 362/615; 362/561; 362/607
(58) Field of Classification Search .............. 362/31, 362/560, 561, 558, 27, 26, 606, 607, 615, 362/616, 617, 629; 349/64, 30, 112; 313/512
See application file for complete search history.

(56) References Cited

U.S. PATENT DOCUMENTS

| | | | | |
|---|---|---|---|---|
| 5,189,405 | A * | 2/1993 | Yamashita et al. ......... | 313/512 |
| 5,293,262 | A * | 3/1994 | Adachi et al. ............. | 349/149 |
| 5,648,858 | A * | 7/1997 | Shibata et al. ............. | 349/57 |
| 6,313,891 | B1 * | 11/2001 | Nagakubo et al. ......... | 349/65 |
| 2002/0113924 | A1 * | 8/2002 | Saito et al. ............... | 349/112 |

FOREIGN PATENT DOCUMENTS

| JP | EP0545558 | | 6/1993 |
|---|---|---|---|
| JP | 6-54038 | | 7/1994 |
| JP | EP0733927 | | 9/1996 |
| JP | EP0891119 | | 1/1999 |
| JP | 11-223812 | | 8/1999 |
| JP | 11223812 A | * | 8/1999 |

OTHER PUBLICATIONS

Korean Office Action dated Jun. 29, 2004 with a partial English translation.
Taiwanese Office Action dated Sep. 15, 2003 with Japanese and partial English translations.

* cited by examiner

*Primary Examiner*—John Anthony Ward
(74) *Attorney, Agent, or Firm*—McGinn IP Law Group, PLLC

(57) ABSTRACT

A liquid crystal display panel device has a backlight unit for illuminating the reverse surface of a liquid crystal display panel, and the backlight unit includes a diffusion plate, a diffusion sheet adhered to one of the major surfaces of the diffusion plate, a lamp house and a moisture-proof sheet inserted between the other surface of the diffusion plate and the lamp house; the moisture-proof sheet prevents the diffusion plate from vaporization of water contained in the diffusion plate, and the diffusion plate is not warped; the diffusion plate maintains the initial shape immediately after the assemblage into the backlight unit so that the liquid crystal display panel is continuously uniformly illuminated by the backlight unit.

21 Claims, 7 Drawing Sheets

BACKLIGHT UNIT UNIFORMLY ILLUMINATING OBJECT REGARDLESS OF LAPSE OF TIME AND LIQUID CRYSTAL DISPLAY PANEL DEVICE USING THE SAME

FIELD OF THE INVENTION

This invention relates to a transmission type visual image producing device and, more particularly, to a liquid crystal display panel device and a backlight unit incorporated in the liquid crystal display panel device.

DESCRIPTION OF THE RELATED ART

A liquid crystal display panel device is so thin, light and low in power consumption that a data processing unit is combined with the liquid crystal display panel device for a portable personal computer system. The users desire the computer manufacturers to develop personal computer systems much more portable than those sold in the market. The computer manufacturers are developing new personal computer systems which are enhanced in portability. The liquid crystal display panel device is a major part of the personal computer system so that the computer manufacturers request the device manufacturers to develop liquid crystal display panel devices thinner than the present models.

A liquid crystal display panel device is broken down into a liquid crystal display panel, i.e., a pixel array and a backlight unit. A driver circuit periodically supplies a scanning signal and a data signal to the pixel array so as to make selected ones of the pixels transparent. The backlight unit radiates light to the liquid crystal display panel, and the light passes the transparent pixels. Then, visual images are produced on the liquid crystal display panel. In order to make the liquid crystal display panel device thinner than the present models, either liquid crystal display panel or backlight unit is to be reduced in thickness.

Although the device manufacturers fabricated various liquid crystal display panel devices equipped with thin backlight units, the liquid crystal display panels are not uniformly illuminated with the backlight, and images are irregular in brightness on the image producing planes. This means that the liquid crystal display panel devices merely produced poor visual images on the pixel arrays due to the irregular luminance. A countermeasure has been proposed against the irregular luminance, and is disclosed in Japanese Utility Model Application laid-open No. 6-054038.

FIGS. 1 and 2 show the prior art liquid crystal display panel device disclosed in the Japanese Utility Model Application laid-open. The prior art liquid crystal display panel device comprises a diffusion sheet 1, a diffusion plate 2, a lamp house 3, a light source 4, a spacer 5 and a liquid crystal display panel 6. The light source 4 is implemented by plural fluorescent lamps. Only one fluorescent lamp may serve as the light source 4. The fluorescent lamps 4 are inside the lamp house 3. The inner surface of the lamp house 3 is covered with a reflection layer. When the fluorescent lamps 4 are energized, light is emitted from the fluorescent lamps 4, and is reflected on the reflection layer. A plurality of pixels are defined in the liquid crystal display panel 6, and are selectively changed between transparent state and non-transparent state for producing a visual image.

The diffusion plate 2 is formed of synthetic resin, and is opalescent. The diffusion sheet 1 is adhered to the diffusion plate 2, and is fixed to the liquid crystal display panel 6 by means of the spacer 5. The lamp house 3 is fixed to the reverse surface of the diffusion plate 2, and the light is incident onto the diffusion plate 2.

The light, part of which was reflected on the reflection sheet inside the lamp house 3, passes through the diffusion plate 2 and diffusion sheet 1, and is incident onto the liquid crystal display panel 6. While the light is passing through the diffusion plate 2 and diffusion sheet 1, the light is dispersed over the diffusion sheet 1, and the liquid crystal display panel 6 is uniformly illuminated with the backlight. When the liquid crystal becomes partially transparent and partially non-transparent, the light produces a visual image on the liquid crystal display panel 6.

Even if the manufacturer reduces the thickness of the backlight unit, the diffusion sheet 1 and diffusion plate 2 make the liquid crystal display panel 6 uniformly illuminated with the backlight, and are desirable for the small-sized liquid crystal display panel device. However, a problem is encountered in the prior art liquid crystal display panel device in that the backlight tends to lose the uniformity as time goes by.

SUMMARY OF THE INVENTION

It is therefore an important object of the present invention to provide a backlight unit, which keeps output light uniform regardless of the lapse of time.

It is also an important object of the present invention to provide a liquid crystal display panel unit, which produces visual images on an image producing plane at uniform brightness regardless of the lapse of time.

The present inventors contemplated the problem inherent in the prior art liquid crystal display panel device, and noticed that the diffusion panel 2 had been warped. The present inventors investigated the prior art liquid crystal display panel device for causes of the warped diffusion plate 2. The present inventors found that, although the lamp house 3 was attached to the diffusion plate 2, the boundary between the lamp house 3 and the diffusion plate 2 was not airtight. The air freely penetrated into the boundary between the lamp house 3 and the diffusion plate 2, and flew out from the boundary. On the other hand, the diffusion sheet 3 was strongly adhered to the diffusion plate 2 over the entire surface, and the air could not reach the surface of the diffusion plate 2. This meant that the air had carried the moisture onto only the surface of the diffusion plate 3 attached to the lamp house 3. The moisture had made the surface wet and kept the other surface dry. In this situation, the incident light had vaporized the water damped in the surface portion of the diffusion plate 2, and made it shrunk. The present inventors concluded that the cause of the warped diffusion plate 2 was the water damped in the surface portion of the diffusion plate 2.

To accomplish the object, the present invention proposes to make the boundary between a diffusion plate and a lamp house wet.

In accordance with one aspect of the present invention, there is provided a backlight unit for uniformly outputting light to a target comprising a diffusion plate having an incident major surface and an output major surface reverse to said incident major surface and dispersing light during propagation of light from said incident major surface to said output major surface, a diffusion sheet having an incident surface attached to said output major surface of said diffusion plate and an output surface reverse to said incident surface and making said light uniform in luminance when said light is output from said output surface, a light unit connected to said incident major surface of said diffusion plate and radiating said light to said incident major surface, and a moisture-proof sheet transparent to said light and inserted between said light unit and said incident major surface of said diffusion plate for maintaining humidity on said incident major surface.

In accordance with another aspect of the present invention, there is provided a liquid crystal display panel for producing visual images comprising a liquid crystal display panel having an incident plane and an image producing plane reverse to the incident plane and making the image producing plane partially transparent to light and partially non-transparent to the light and a backlight unit for uniformly illuminating the incident plane with the light including a diffusion plate having an incident major surface and an output major surface reverse to the incident major surface and dispersing the light during propagation of from the incident major surface to the output major surface, a diffusion sheet having an incident surface attached to the output major surface of the diffusion plate and an output surface reverse to the incident surface and making the light uniform in luminance when the light is output from the output surface, a light unit connected to the incident major surface of the diffusion plate and radiating the light to the incident major surface and a moisture-proof sheet transparent to the light and inserted between the light unit and the incident major surface of the diffusion plate for maintaining humidity on the incident major surface.

BRIEF DESCRIPTION OF THE DRAWINGS

The features and advantages of the backlight unit and liquid crystal display panel device will be more clearly understood from the following description taken in conjunction with the accompanying drawings, in which.

DESCRIPTION OF THE PREFERRED EMBODIMENTS

First Embodiment

Figure 1:
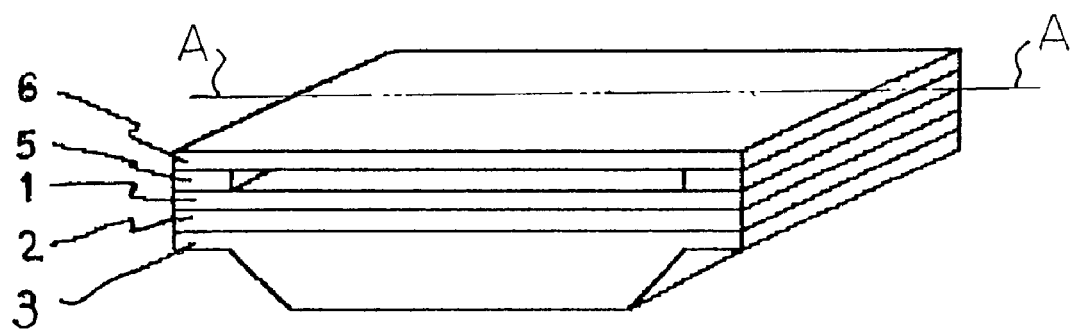
FIG. 1 is a perspective view showing the structure of the prior art liquid crystal display panel device disclosed in the Japanese Utility Model Application laid-open.
Figure 2:
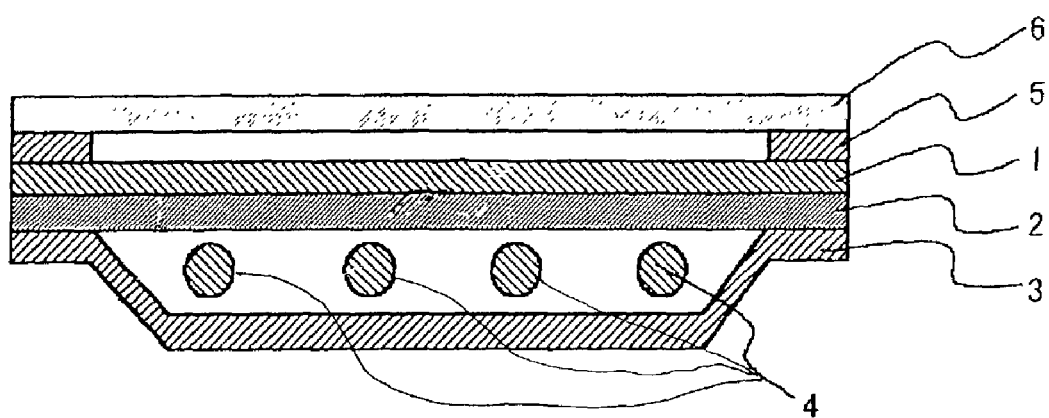
FIG. 2 is a cross sectional view taken along line A—A of FIG. 1 and showing the structure of the prior art liquid crystal display panel device.
Figure 3:
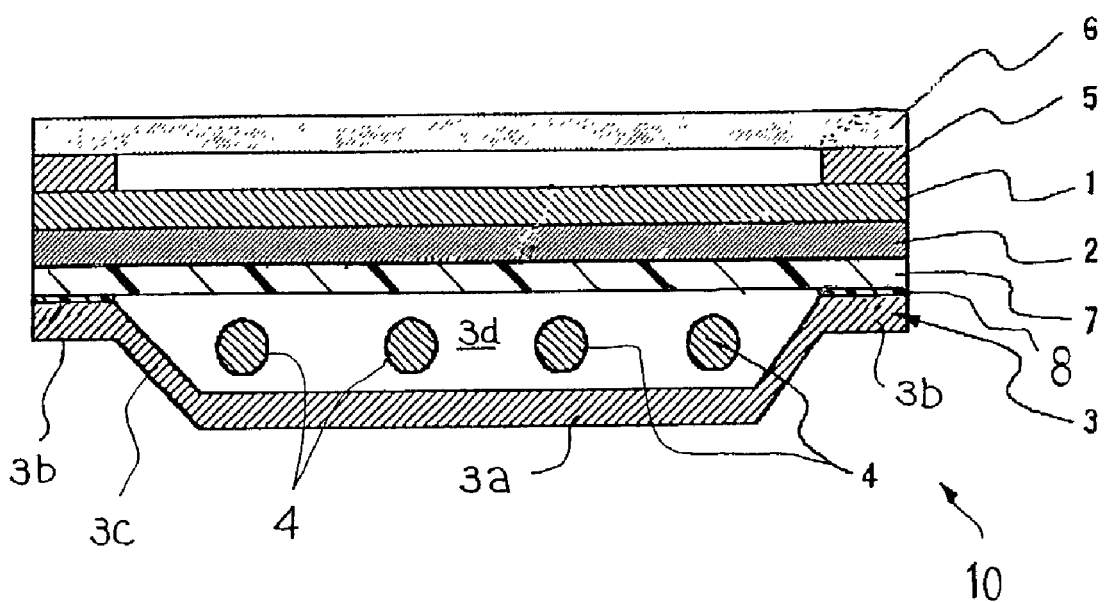
FIG. 3 is a cross sectional view showing the structure of a liquid crystal display panel device according to the present invention.

Referring to FIG. 3 of the drawings, a liquid crystal display panel device embodying the present invention largely comprises a spacer 5, a liquid crystal display panel 6 and a backlight unit 10. The spacer 5 keeps the liquid crystal display panel 6 spaced from the backlight unit 10. A driver circuit makes the liquid crystal display panel 6 partially transparent and partially non-transparent, and the reverse surface of the liquid crystal display panel 6 is illuminated with the backlight. The light passes through the transparent portion of the liquid crystal display panel 6, and produces visual images on the image-producing surface of the liquid crystal display panel 6.

Although any sort of liquid crystal display panel is available for the liquid crystal display panel device according to the present invention, the liquid crystal display panel 6 has a structure shown in FIG. 4, and the liquid crystal display panel 6 is described hereinbelow.

Figure 4:
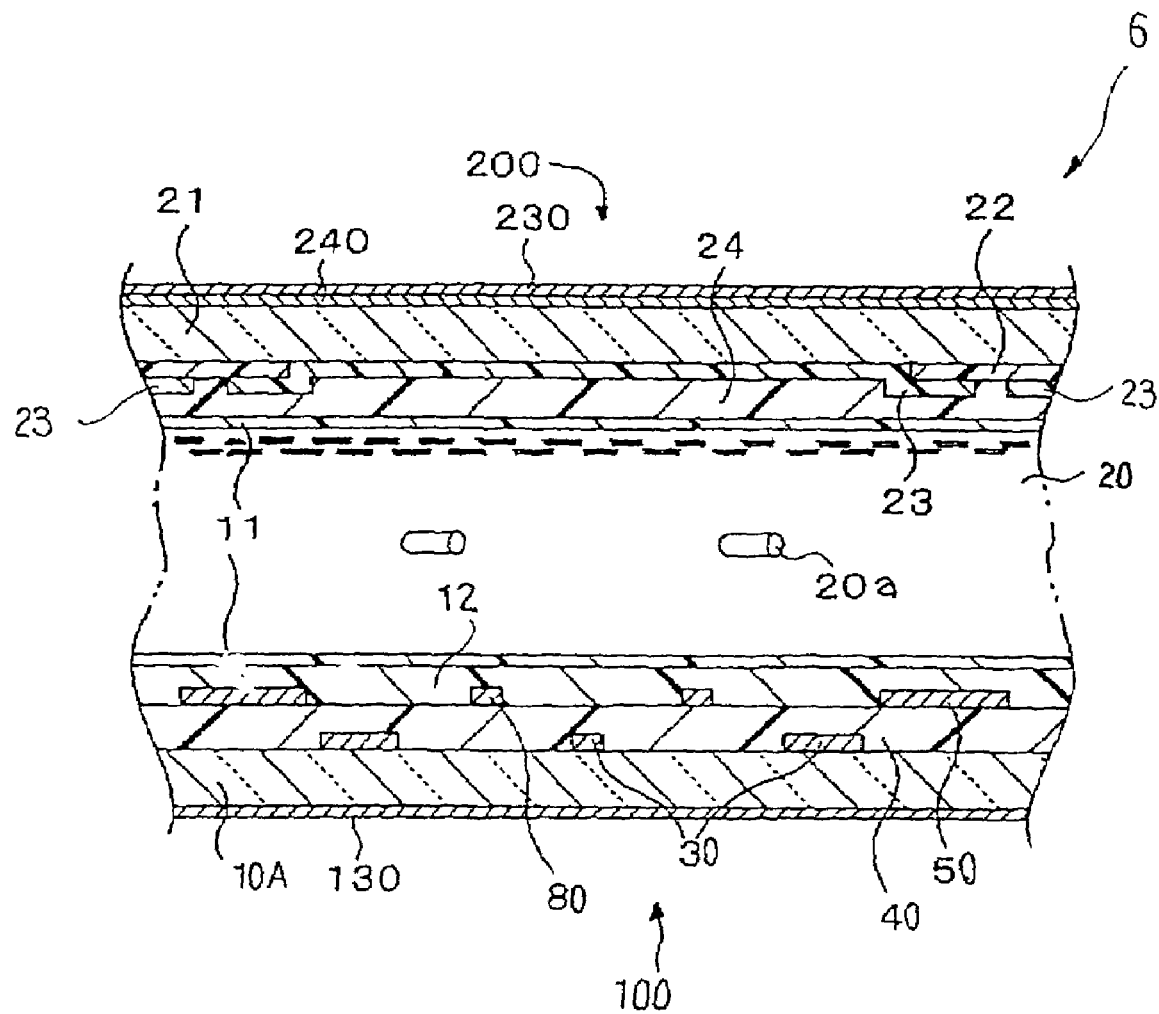
FIG. 4 is a cross sectional view showing the structure of a liquid crystal display panel incorporated in the liquid crystal display panel device.

FIG. 4 shows the liquid crystal display panel 6. The liquid crystal display panel 6 largely comprises a pair of substrate structures 100/200, spacers (not shown), a sealing layer (not shown) and liquid crystal 20. One of the liquid crystal molecules is labeled with reference 20a.

The substrate structure 100 is spaced from the other substrate structure 200 by means of the spacers (not shown) and the sealing layer (not shown), and an inner space takes place between the substrate structures 100 and 200. The sealing layer extends along the peripheries of the substrate structures 100 and 200, and spacers are scattered inside of the sealing layer. The spacers make the cell gap or the thickness of the liquid crystal layer substantially costant.

The substrate structure 100 includes a transparent substrate 10A, and a common electrode 30 and scanning lines (not shown) are patterned on the major surface of the transparent substrate 1. The common electrode 30 is of the order of 400 nanometers thick. The transparent substrate 1 is, by way of example, formed of glass. A polarizing plate 130 is adhered to the reverse surface of the transparent substrate 10A. The scanning lines and the common electrode 30 are covered with an insulating layer 4, and amorphous silicon layers (not shown) are patterned on the insulating layer 4 over parts of the scanning lines at intervals. In this instance, the insulating layer 4 is formed of silicon nitride expressed as SiNx. Data lines 50, source electrodes (not shown), drain electrodes (not shown) and pixel electrodes 80 are patterned on the insulating layer 40. The source electrodes, drain electrodes and data lines 50 are formed of non-transparent material such as, for example, chromium, and the pixel electrodes 80 arc formed of conductive transparent material such as, for example, indium tin oxide. The pixel electrodes 80 are arranged in such a manner as to be offset from an associated part of the common electrode 30.

The source electrodes are held in contact with the associated source regions in the amorphous silicon layers, and the drain electrodes are held in contact with the associated drain regions in the amorphous silicon layers. Thus, the source region is spaced from the associated drain region in each of the amorphous silicon layers, and the remaining portion of the amorphous silicon layer serves as a channel region. The part of the scanning line under the channel region serves as a gate electrode.

The source electrodes are integral with the associated pixel electrode 80, and the drain electrodes are integral with the associated the data lines 50. The driver circuit (not shown) supplies a scanning signal to the scanning lines and a data signal to the data lines 50. The part of the scanning line, i.e., gate electrode, insulating layer 4, amorphous silicon layer, source electrode and drain electrode as a whole constitute a thin film transistor. The thin film transistors are connected in series to the associated pixel electrodes 80, respectively. The data line 50, source electrode, drain electrode and pixel electrode 80 are covered with a passivation layer 12, and an orientation layer 11 is laminated on the passivation layer 12.

The other substrate structure 200 includes a transparent substrate 21. The transparent substrate 21 is, by way of example, formed of glass. The transparent glass 21 is sandwiched between black matrix/color filter 22/23 and a conductive layer 240. The conductive layer 240 is overlain by a polarizing plate 230, and the black matrix 22 and the color filter 23 are covered with an insulating layer 24. Apertures are formed in the black matrix 22, and each of the apertures is aligned with one of the pixel electrodes 80 and the associated part of the common electrode 30. The aperture is closed with the color filter 23. The color filters 23 are selectively colored in red, green and blue. The black matrix 22 and color filter 23 are covered with an insulating layer 24, and the insulating layer 24 is formed of silicon nitride SiNx. The insulating layer 24 in turn is covered with an orientation layer 11.

Each of the thin film transistors, associated pixel electrode 80, associated part of the common electrode 30 and color filter 23 aligned with the pixel electrode 80 as a whole constitute a sub-pixel, and three sub-pixels, i.e., red sub-pixel, green sub-pixel and green sub-pixel and a piece of the liquid crystal therebetween form in combination one of the pixels. The pixels are arranged in matrix, and the matrix of pixels serves as the image producing plane.

The driver circuit periodically changes the scanning lines to an active level, and supplies a data signal representative of pieces of a visual image to the data lines 50 in synchronism with the scanning signal. When a scanning line is changed to the active level, the thin film transistors associated thereto concurrently turn on, and the pieces of visual image information are written into the pixel electrodes through the thin film transistors on the scanning line. A constant potential is applied to the common electrode 30. Then, local electric fields are created between selected one of the pixel electrodes 80 and the associated parts of the common electrode 30. The lines of electric force pass through the associated pieces of liquid crystal 20, and the liquid crystal molecules 20a selectively change the tilt angle in the local electric fields. Then, the sub-pixels are selectively changed to transparent. The light passes through the transparent sub-pixels and the color filters 23, and a full-color visual image is produced on the image-producing plane.

Turning back to FIG. 3, the backlight unit 10 includes a diffusion sheet 1, a diffusion plate 2, a lamp house 3, a light source 4 and a moisture-poof sheet 7. The diffusion plate 2 is formed of synthetic resin, and is opalescent. The diffusion sheet 1 is adhered to one of the major surfaces of the diffusion plate 2 over the entire surface. The diffusion sheet 1 is fixed to the spacer 5, which in turn is fixed to the reverse surface of the liquid crystal display panel 6. The diffusion plate 2 disperses incident light while the light is passing there-through. The diffusion sheet 1 makes the luminance of light uniform on the light output surface so that the reverse surface of the liquid crystal display panel 6 is uniformly illuminated with the backlight. Thus, the diffusion sheet 1 and diffusion plate 2 are same as those of the prior art liquid crystal display panel unit.

The lamp house 3 has a bottom portion 3a, a peripheral portion 3b and a side-wall portion 3c. The peripheral portion 3b is connected to the bottom portion 3a through the side-wall portion 3c, and a dent 3d is formed in the lamp house 3. The inner surfaces of the side-wall/bottom portions 3c/3a are covered with a reflecting layer. The light source 4 is implemented by plural fluorescent lamps, and is accommodated in the lamp house 3. The light source 4 is connected to an electric power source (not shown). The opening of the dent 3d is closed by means of the moisture-proof sheet 7. The moisture-proof sheet 7 is adhered to the peripheral portion 3b by means of adhesive compound 8. The moisture-proof sheet 7 is held in hermetically contact with the other of the major surfaces of the diffusion plate 2. In other words, the other surface of the diffusion plate 2 is hermetically sealed with the moisture-proof sheet 7. Thus, the moisture-proof sheet 7 prevents the other surface of the diffusion plate 2 from moisture in the atmosphere. In fact, the moisture-proof sheet 7 keeps the water content of the other surface portion equal to that immediately after the assembled into the backlight unit 10.

The moisture-proof sheet 7 is formed of material with a large transmittance such as, for example, polycarbonate, i.e., PC, polyethylene terephthalate, i.e., PET or glass. The moisture-proof sheet 7 may be formed from a diffusion sheet formed of polyethylene terephthalate. In this instance, the moisture-proof sheet 7 is of the order of 0.18 millimeter thick.

While the driver circuit is producing visual images on the image-forming plane of the liquid crystal display panel 6, light is radiated from the light source 4. Heat is also radiated toward the diffusion plate 2. The light passes through the moisture-proof sheet 7, and is incident onto the diffusion plate 2. While the light is being propagated in the diffusion plate 2 and diffusion sheet 1, the light is dispersed. For this reason, the light is output from entire surface of the diffusion sheet 1 at uniform intensity, and is incident onto the reverse surface of the liquid crystal display panel 6. The light passes through the transparent sub-pixels so that the images have uniform brightness over the image producing plane. Although the diffusion plate 2 is heated, the moisture-proof sheet 7 does not allow the water content to escape to the atmosphere.

Even though time goes by, the moisture-proof sheet 7 keeps the water content in the other surface portion equal to that in the surface portion held in contact with the diffusion sheet 1. Any warp is not found in the diffusion plate 2. Thus, the moisture-proof sheet 7 permits the liquid crystal display panel 6 to be uniformly illuminated by the backlight unit 10 regardless of the lapse of time.

As will be understood from the foregoing description, the moisture-proof sheet 7 prevents the other surface portion of the diffusion plate 2 from vaporization of water. The diffusion plate 2 is maintained the initial shape immediately after the assemblage into the backlight unit 10. The diffusion plate is never warped, and the reverse surface of the liquid crystal display panel 6 is uniformly illuminated by the backlight unit 10.

Second Embodiment

Figure 5:
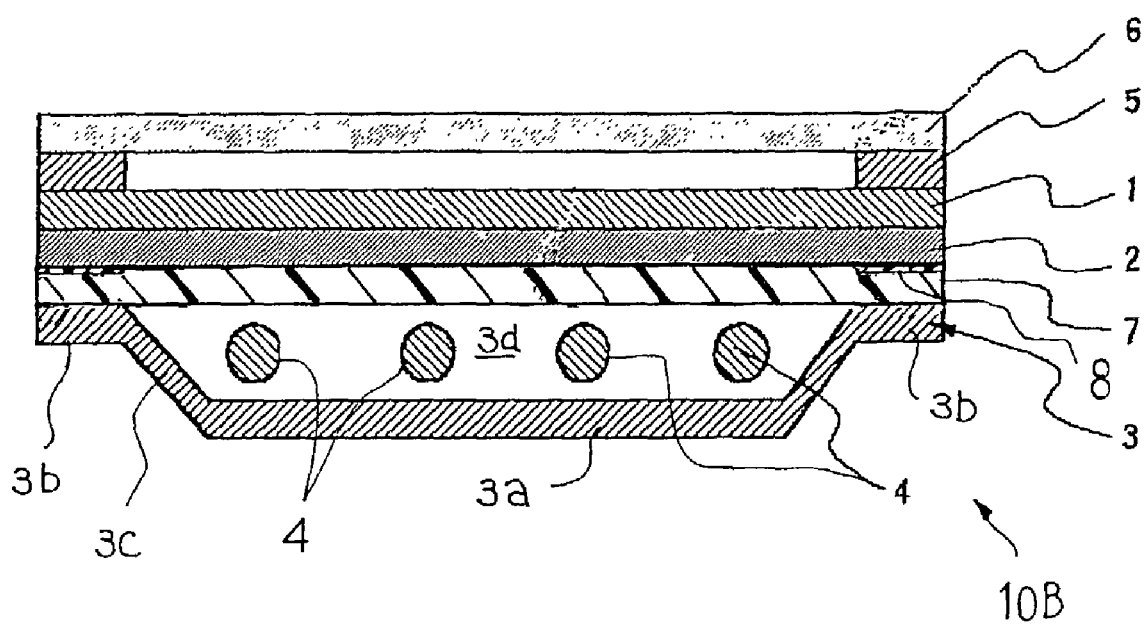
FIG. 5 is a cross sectional view showing the structure of another liquid crystal display panel device according to the present invention.

Turning to FIG. 5 of the drawings, another liquid crystal display panel unit embodying the present invention also largely comprises a liquid crystal display panel 6 and a backlight unit 10B. The liquid crystal display panel 6 is similar to that of the first embodiment, and the backlight unit 10B is different from the backlight unit 10 only in that the moisture-proof sheet 7 is adhered to the periphery of the diffusion plate 2. For this reason, components of the backlight unit 10B are labeled with references same as those designating corresponding components of the backlight unit 10 without detailed description for the sake of simplicity.

The backlight unit 10B achieves the advantages of the backlight unit 10 by virtue of the moisture-proof sheet 7.

Third Embodiment

Figure 6:
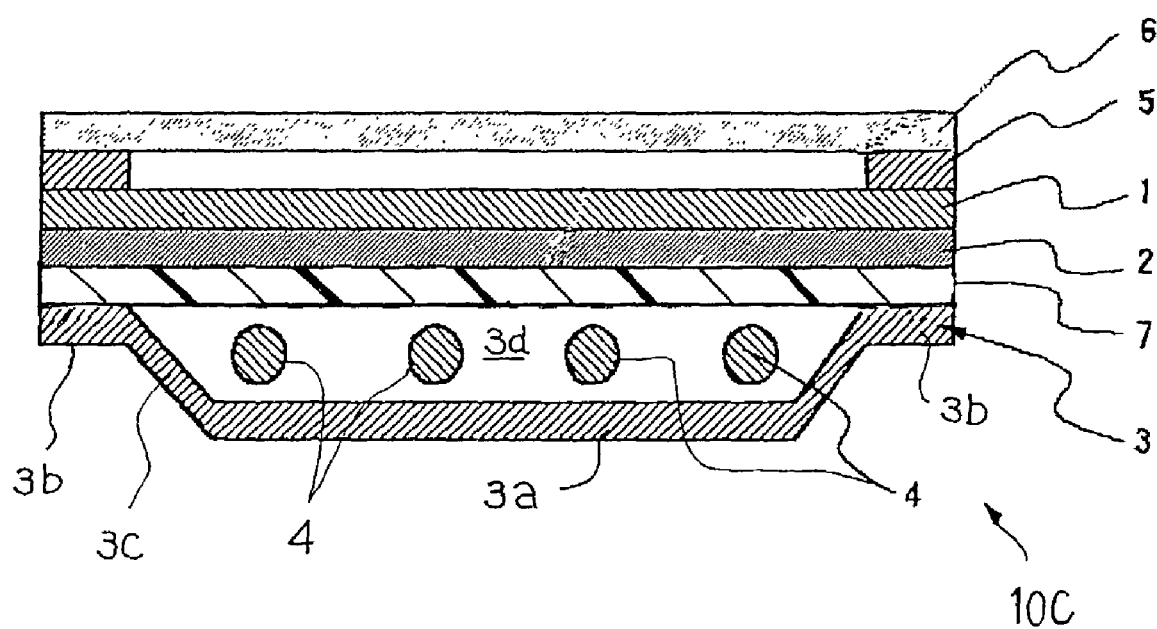
FIG. 6 is a cross sectional view showing the structure of yet another liquid crystal display panel device according to the present invention.

Turning to FIG. 6 of the drawings, yet another liquid crystal display panel unit embodying the present invention also largely comprises a liquid crystal display panel 6 and a backlight unit 10C. The liquid crystal display panel 6 is similar to that of the first embodiment, and the backlight unit 10C is different from the backlight unit 10 only in that the moisture-proof sheet 7 is pinched between the diffusion plate 2 and the peripheral portion 3b of the lamp house 3. For this reason, components of the backlight unit 10C are labeled with references same as those designating corresponding components of the backlight unit 10 without detailed description for the sake of simplicity. The backlight unit 10C also achieves the advantages of the backlight unit 10 by virtue of the moisture-proof sheet 7.

Fourth Embodiment

Figure 7:
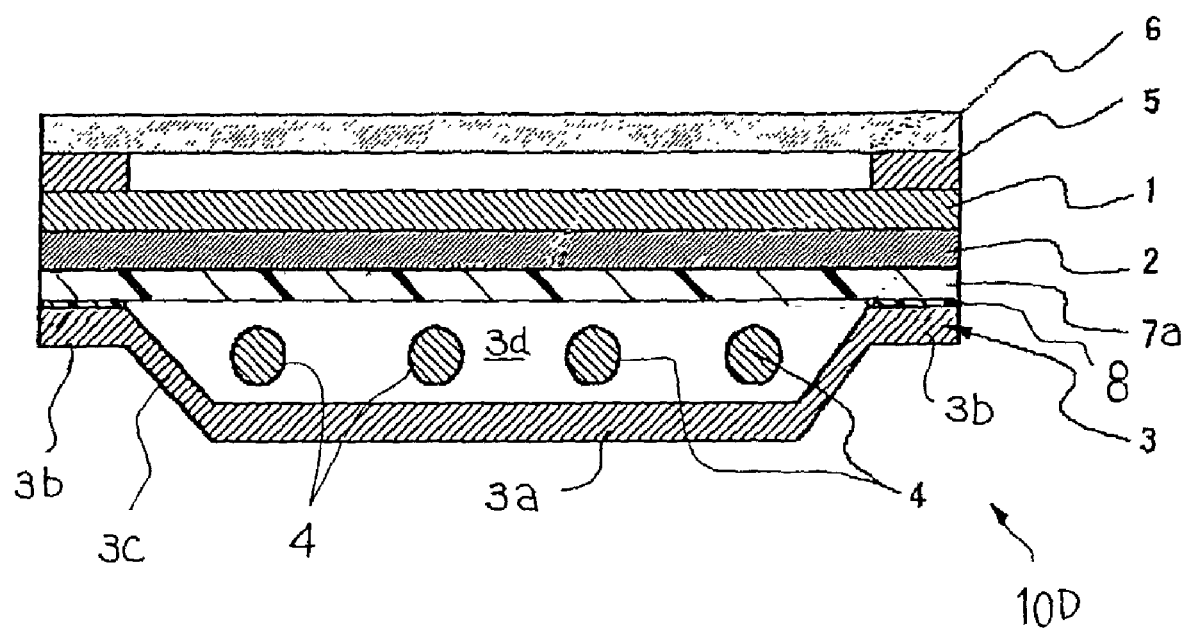
FIG. 7 is a cross sectional view showing the structure of still another liquid crystal display panel device according to the present invention.

Turning to FIG. 7 of the drawings, still another liquid crystal display panel unit embodying the present invention also largely comprises a liquid crystal display panel 6 and a backlight unit 10D. The liquid crystal display panel 6 is similar to that of the first embodiment, and the backlight unit 10D is different from the backlight unit 10 only in that a gradation pattern is printed on the moisture-proof sheet 7a. For this reason, other components of the backlight unit 10D are labeled with references same as those designating corresponding components of the backlight unit 10 without detailed description for the sake of simplicity.

The backlight unit 10D achieves the advantages of the backlight unit 10 by virtue of the moisture-proof sheet 7. Moreover, the gradation pattern enhances the uniformity of brightness.

The present inventors evaluated the liquid crystal display panel according to the present invention. The present inventors fabricated samples of the prior art liquid crystal display panel device and samples of the liquid crystal display panel device according to the present invention. All the samples had 18-inch image producing planes. Although the diffusion plates of the prior art samples were directly illuminated by the backlight unit, the moisture-proof sheets prevented the diffusion plates from vaporization of water content in the samples of the liquid crystal display panel device according to the present invention.

The present inventors first put both of the prior art samples and the samples of the present invention in high-temperature humidity atmosphere, and maintained those samples there for 12 hours. The high-temperature humidity atmosphere was 60 degrees in centigrade, and the humidity was 90%.

Subsequently, the present inventors energized the backlight units of the prior art samples and the backlight units of the samples of the present invention, and maintained the prior art samples and the samples of the present invention in the atmosphere at 45 degrees in centigrade and at 50% in humidity for four hours.

The present inventors disassembled the backlight units, and measured the flatness of the diffusion plates. The diffusion plates of the prior art samples were warped, and the central area projected toward the associated liquid crystal display panels by 1–2 millimeters. On the other hand, the projection did not exceed 0.5 millimeter in the diffusion plates of the samples according to the present invention. Thus, the present inventors confirmed that the moisture-proof sheet 7/7a was effective against the deformation of the diffusion plate and enhanced the uniformity of the backlight.

As will be appreciated from the foregoing description, the moisture-proof sheet 7/7a keeps the water content in the diffusion plate 2 substantially equal to that immediately after the assemblage into the backlight unit 10/10B/10C/10D. Even though the diffusion plate 2 is radiated with the light during the image production, the diffusion plate 2 is never warped, and the reverse surface of the liquid crystal display panel 6 is uniformly illuminated by the backlight unit 10/10B/10C/10D. This results in the brightness of images is uniform over the image producing plane. Any irregularity in brightness never takes place on the image-producing plane regardless of the lapse of time.

In the above-described embodiments, the light source 4 and lamp house as a whole constitute a light unit, and the peripheral portion 3b serves as a rim.

Although particular embodiments of the present invention have been shown and described, it will be apparent to those skilled in the art that various changes and modifications may be made without departing from the spirit and scope of the present invention.

In the above-described embodiments, the active matrix liquid crystal display panel 6 is assembled with the backlight unit 10/10B/10C/10D. However, the liquid crystal display panel does not set any limit to the present invention. The backlight unit 10/10B/10C/10D according to the present invention may be assembled with any sort of the liquid crystal display panel.

Any moisture-proof material is available for the backlight unit in so far as the sheet is transparent to the backlight.

What is claimed is:

1. A backlight unit of the type provided just under a liquid crystal display panel for uniformly outputting light to a target, comprising:
   a diffusion plate having an incident major surface and an output major surface reverse to said incident major surface, and dispersing light during propagation of light from said incident major surface to said output major surface;
   a diffusion sheet having an incident surface attached to said output major surface of said diffusion plate and an output surface reverse to said incident surface, and making said light uniform in luminance when said light is output from said output surface;
   a light unit connected to said incident major surface of said diffusion plate, and radiating said light to said incident major surface; and
   a moisture-proof sheet transparent to said light, and inserted between said light unit and said incident major surface of said diffusion plate and forming a moisture-proof seal for maintaining humidity on said incident major surface.

2. The backlight unit as set forth in claim 1, in which said moisture-proof sheet comprises one of polycarbonate, polyethylene terephthalate and glass.

3. The backlight unit as set forth in claim 1, in which said moisture-proof sheet comprises a diffusion sheet.

4. The backlight unit as set forth in claim 3, in which said diffusion sheet comprises polyethylene terephthalate.

5. The backlight unit as set forth in claim 1, in which said light source includes a lamp house comprising a dent, at least one lamp in said dent, and a rim around said dent so that said moisture-proof sheet is sandwiched between said rim and said incident major surface.

6. The backlight unit as set forth in claim 5, in which said moisture-proof sheet is adhered to said rim.

7. The backlight unit as set forth in claim 5, in which said moisture-proof sheet is adhered to said incident major surface.

8. The backlight unit of claim 1, wherein said moisture-proof sheet maintains humidity on the incident major surface of the diffusion plate in such a manner that the risk of warping of the diffusion plate is reduced.

9. The backlight unit of claim 1, wherein said moisture-proof sheet maintains humidity on the incident major surface of the diffusion plate in such a manner that the risk of warping of the diffusion plate is prevented.

10. The backlight unit of claim 1, wherein said moisture-proof sheet maintains the same moisture content on the incident major surface of the diffusion plate as the output major surface of the diffusion plate.

11. A liquid crystal display panel device for producing visual images, comprising:
   a liquid crystal display panel having an incident plane and an image producing plane reverse to said incident plane, and making said image producing plane partially transparent to light and partially non-transparent to said light; and
   a backlight unit for uniformly illuminating said incident plane with said light including
      a diffusion plate having an incident major surface and an output major surface reverse to said incident major surface and dispersing said light during propagation from said incident major surface to said output major surface,
      a diffusion sheet having an incident surface attached to said output major surface of said diffusion plate and an output surface reverse to said incident surface and making said light uniform in luminance when said light is output from said output surface,
      a light unit connected to said incident major surface of said diffusion plate and radiating said light to said incident major surface, and
      a moisture-proof sheet transparent to said light and inserted between said light unit and said incident major surface of said diffusion plate and forming a moisture-proof seal on said incident major surface.

12. The liquid crystal display panel device as set forth in claim 11, in which said moisture-proof sheet comprises one of polycarbonate, polyethylene terephthalate and glass.

13. The liquid crystal display panel device as set forth in claim 11, in which said moisture-proof sheet comprises a diffusion sheet.

14. The liquid crystal display panel device as set forth in claim 13, in which said diffusion sheet comprises polyethylene terephthalate.

15. The liquid crystal display panel device as set forth in claim 11, in which said light source includes a lamp house comprising a dent, at least one lamp in said dent, and a rim around said dent so that said moisture-proof sheet is sandwiched between said rim and said incident major surface.

16. The liquid crystal display panel device set forth in claim 15, in which said moisture-proof sheet is adhered to said rim.

17. The liquid crystal display panel device as set forth in claim 15, in which said moisture-proof sheet is adhered to said incident major surface.

18. A backlight unit of the type provided just under a liquid crystal display panel for uniformly outputting light, comprising:
   a diffusion plate having an incident major surface and an output major surface reverse to said incident major surface;
   a diffusion sheet having an incident surface attached to said output major surface of said diffusion plate and an output surface reverse to said incident surface;
   a light unit connected to said incident major surface of said diffusion plate, and radiating said light to said incident major surface; and
   a moisture-proof sheet forming a moisture-proof seal on said incident major surface.

19. The backlight unit of claim 18, wherein said moisture-proof sheet comprises one of polycarbonate, polyethylene terephthalate and glass.

20. The backlight unit of claim 18, wherein said moisture-proof sheet comprises a diffusion sheet.

21. A backlight unit of the type provided just under a liquid crystal display panel, comprising:
   a diffusion plate having an incident major surface and an output major surface reverse to said incident major surface;
   a diffusion sheet having an incident surface attached to said output major surface of said diffusion plate and an output surface reverse to said incident surface;
   a light unit connected to said incident major surface of said diffusion plate; and
   a moisture-proof sheet between said light unit and said incident major surface of said diffusion plate that forms a moisture-proof seal on said incident major surface.

* * * * *